UNITED STATES PATENT OFFICE.

NATHL. C. FOWLER, OF YARMOUTH, MASSACHUSETTS.

IMPROVEMENTS IN COMBINING ALUMINIUM WITH VULCANITE AND OTHER MATERIALS.

Specification forming part of Letters Patent No. 46,230, dated February 7, 1865.

*To all whom it may concern:*

Be it known that I, NATHANIEL C. FOWLER, of Yarmouth, Barnstable county, Massachusetts, have invented a new and useful Combination of Aluminium and Vulcanite; and I do hereby declare the following to be a full, clear, and exact description of the same, sufficient to enable a person skilled in the art to which it appertains to make and use my invention.

It has long been an object with dentists and other metallurgists to procure a metal at an economical rate which was strong and not subject to oxidization, and, whatever may have been known of aluminium, it has hitherto failed to be practically utilized in arts or manufactures except to a limited extent, and then rather as a matter of scientific curiosity than of mechanical or mercantile value.

I have discovered a method of utilizing aluminium by mechanically combining it with vulcanite or rubber, which combination may be made by various means—such as by inlaying the metal into plastic rubber and afterward vulcanizing the latter to give it the requisite rigidity and durability, or by reducing the aluminium to a comminuted state by means of a revolving toothed wheel, a file, or otherwise, and spreading the granulated metal upon a thin sheet of rubber, which is then rolled into a scroll and passed between the rollers of a plate-mill, reducing it again to a sheet. This process of scrolling and flattening is repeated as often as may be necessary to mingle intimately the metal and gum. In this plastic condition it is molded or pressed into any required form and then vulcanized to the required hardness. This commingling of the metal and rubber may be performed in various ways by mechanical manipulation or by immersing the granulated metal in solution of rubber. I do not limit myself to any special method of mechanically combining the two.

One form of the application of my invention is to take strips or pieces of aluminium of any required shape with special mechanical adaptation or for mere ornamentation and insert them into the rubber while the latter is in a plastic condition, after which it is vulcanized. By this means I make various kinds of useful and ornamental appliances or mechanical connections and adaptations in or for processes of art or manufacture in which the metal is closely and firmly embraced by the gum retaining its intimate connection therewith during and after the process of vulcanization. For instance, for dental purposes I make holes by punching up pieces which form projections on the palate or other plate of aluminium, mold the rubber around it in the required form, in connection with the dentures, and afterward subject the piece consisting of the plate and attached rubber and dentures, to the well-known process of vulcanization, after which the portions of rubber will be found in close contact with the surface of the metal, as the latter has not undergone any sulphurization or corrosion which will loosen the pin of vulcanite in the orifice in the plate. The metals, with but few exceptions, are corroded by being exposed in contact with rubber in the process of vulcanization. This arises from the development of sulphureted hydrogen during the said process, which, with the exceptions referred to, has the effect of sulphurizing and corroding the surface and edges of the metal and destroying the intimate connection of it and the vulcanite, even where it does not proceed so far as to destroy the metal altogether. Platinum and gold may be used with good effect, but they are expensive and many times heavier than aluminium, which is an important consideration under many circumstances.

I have instanced the applicability of my invention to the operations of mechanical dentistry merely as an instance of its application, but not as limiting myself to that department of useful arts and manufactures.

I propose to make finger-rings, ear-rings, breastpins, jewel-boxes, card-cases, napkin-rings, work-boxes, desks, mantel and table ornaments, statuettes, knife and brush handles, lamp-stands, and many other useful and ornamental articles, which may be made by the inlaying or the granulating process, as may best suit the taste and purpose. I also propose to attach vulcanite soles to boots and shoes by tacks of aluminium inserted into the rubber before vulcanization, and to unite by a rivet of vulcanite the ends of a hoop or ring of aluminium or the pieces of an ornament, or generally to make any other connections where it is desired to unite aluminium to vulcanite. Plates, rods, or strips of the metal are allied with interposed portions of the rubber, or the latter may be encircled with rings of the metal.

I do not consider it necessary to make explicit reference to all the modifications of application of which this invention is susceptible. Suffice it to say that I depend upon this fact, which is the main characteristic of my invention, and which adapts my combination to numerous branches of industrial art and manufacture, that after the metal and gum have been brought into contact in the way and in the shape adapted to the use for which the finished product is designed, the rubber may be vulcanized, giving it the durability, tenacity, and rigidity consequent upon that process without sulphurization or corrosion of the surface of the metal, which, did it occur, would have the effect of impairing the absolute contact of the metal and gum, even if it did not actually destroy the plate.

By this invention I am enabled to construct a variety of articles having the qualities of beauty, lightness, durability, incorrodibility, and the desired degree of rigidity, and which are peculiarly adapted to situations of exposure.

Various processes of inlaying may be practiced by the use of this invention, such as escutcheons, tablets, name-plate, or filagree ornaments of aluminium on the plate, handle, or piece of vulcanite. Plates for inscriptions or other uses which might be named may be firmly embedded in the rubber and the latter subjected to the vulcanizing process with effect and security; or the converse of this process may be applied and the aluminium inlaid with vulcanite, as the various uses of the multifarious articles may indicate or the suggestions of taste and propriety of ornamentation may render appropriate.

I shall not burden this specification with any attempt to anticipate all the various uses to which my invention is applicable, nor prescribe in detail the modes of its application or special adaptation to individual cases, as these will vary, but I will further mention that it may be by a series of pins, hooks, or staples punched up from the plate or metal, or a series of conical holes in the metal.

Having thus described my invention, what I claim therein as new, and desire to secure by Letters Patent, is—

1. Combining granulated aluminium with vulcanite or rubber or analogous material—such as gutta-percha—forming a compound or composition of matter, substantially as described.

2. The use of aluminium for the purpose of forming the joinings of articles made of vulcanite, for attaching rubber or vulcanite to other materials, and for inlaying and ornamenting articles of vulcanite.

3. The use of vulcanite for the purpose of attaching articles made of aluminium to other materials or to other articles made of aluminium.

4. Inlaying articles made of aluminium with vulcanite and uniting articles made of aluminium by a clasp, rivet, or other fastening or ornamental device made of vulcanite.

NATHL. C. FOWLER.

Witnesses:
CHARLES D. SMITH,
ALEXR. A. C. KLAUCKE.